United States Patent
Lim

(10) Patent No.: US 10,389,233 B1
(45) Date of Patent: Aug. 20, 2019

(54) SWITCHED MODE POWER SUPPLY WITH PFC BURST MODE CONTROL

(71) Applicant: Infineon Technologies Austria AG, Villach (AT)

(72) Inventor: Shu Fan Lim, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/154,156

(22) Filed: Oct. 8, 2018

(51) Int. Cl.
*H02M 1/42* (2007.01)

(52) U.S. Cl.
CPC ....... *H02M 1/4225* (2013.01); *H02M 1/4266* (2013.01)

(58) Field of Classification Search
CPC .......................... H02M 1/4225; H02M 1/4266
See application file for complete search history.

(56) References Cited

U.S. PATENT DOCUMENTS

2015/0146458 A1 * 5/2015 Lim ...................... H02M 3/158
363/44

OTHER PUBLICATIONS

Abdel-Rafiman, Sam, et al., "PFC boost converter design guide—1200 W design example", Infineon Technologies AG, Application Note, Revision1.1, Feb. 22, 2016.
Lim, Shu Fan, et al., "A Simple Digital DCM Control Scheme for Boost PFC Operating in Both CCM and DCM", IEEE Transactions on Industry Applications, vol. 47, Issue 4, Jul.-Aug. 2011, pp. 1802-1812.

* cited by examiner

*Primary Examiner* — Adolf D Berhane
*Assistant Examiner* — Afework S Demisse
(74) *Attorney, Agent, or Firm* — Murphy, Bilak & Homiller, PLLC

(57) ABSTRACT

A method of operating a power supply having a PFC stage and an LLC converter coupled to the PFC stage includes: operating the PFC stage in CCM in a steady-state mode of the power supply using a current mode controller, by implementing a current control loop which has AC input voltage measurements as an input; operating the PFC stage in DCM for at least part of a burst mode of the power supply using a voltage mode controller, by implementing a voltage control loop which does not have AC input voltage measurements as an input; and modifying the voltage control loop if an output of the voltage mode controller in burst mode and which is proportional to power in average current mode control falls outside a predetermined range.

22 Claims, 6 Drawing Sheets

SWITCHED MODE POWER SUPPLY WITH PFC BURST MODE CONTROL

BACKGROUND

Digital implementation of continuous conduction mode-discontinuous conduction mode (CCM-DCM) power factor correction (PFC) control is typically based on average current control. In average current control, a reference inductor current is obtained by multiplying the output of the voltage mode controller with a rectified sinusoidal waveform obtained from the AC input voltage. The AC input voltage is needed to yield accurate current reference information for current regulation. Burst/standby mode control for average current mode CCM PFC is typically implemented with AC input voltage measurements, which requires the controller to have a at least one pin for measuring the AC input voltage during burst mode. In burst mode, the reference inductor current can be derived from the output of the voltage mode controller and the AC input voltage. Current mode control ensures that the average inductor current tracks the reference inductor current during the burst-on period. However, AC input voltage measurement may not be possible in burst mode. For example, there may be a resource conflict between AC detection and AC input voltage measurement features during burst mode. Pin count is a factor in controller cost. Some digital controllers minimize the number of pins to reduce cost. For these types of digital controllers, the controller may have a single pin for both the AC input voltage measurement feature and an AC detection feature. AC detection is used to detect if the AC input is disconnected, and to provide a low impedance path to quickly discharge an external capacitor when the AC input is disconnected. AC input voltage measurements are typically done via a high impedance path to reduce power loss. During burst mode, the AC detection feature is typically preferred over the AC input voltage measurement feature because of IEC safety requirement 62368-1. According to this standard, the voltage across the external capacitor must be lower than 60V after 2 seconds from AC disconnect. Hence, AC input voltage measurements may not be available for many types of power supply controllers during burst mode.

Thus, there is a need for an average current mode CCM PFC burst mode control strategy without AC input voltage measurements.

SUMMARY

According to an embodiment of a digital controller for a power supply having a power factor correction (PFC) stage and an LLC converter coupled to the PFC stage, the digital controller comprises: a current mode controller configured to operate the PFC stage in continuous-conduction mode (CCM) in a steady-state mode of the power supply, by implementing a current control loop which has AC input voltage measurements as an input; a voltage mode controller configured to operate the PFC stage in discontinuous-conduction mode (DCM) for at least part of a burst mode of the power supply, by implementing a voltage control loop which does not have AC input voltage measurements as an input; and an adaptive loop configured to modify the voltage control loop if an output of the voltage mode controller in the burst mode and which is proportional to power in average current mode control falls outside a predetermined range.

The predetermined range may define a maximum limit and a minimum limit on power delivered by the power supply in the burst mode, the maximum limit may correspond to a maximum value of the output of the voltage mode controller, and the minimum limit may correspond to a minimum value of the output of the voltage mode controller. The maximum limit may be approximately 2 times a maximum load in the burst load. Separately or in combination, the maximum limit may be lower in the burst mode than in the steady-state mode.

Separately or in combination, the digital controller may be configured to determine an on-time for the PFC stage in the burst mode based on the output of the voltage mode controller, a DC equivalent value of an AC input voltage measurement taken prior to entering the burst mode, and an estimate of a conduction mode inductor current of the PFC stage, and the adaptive loop may be configured to modify the DC equivalent value of the AC input voltage measurement if the output of the voltage mode controller falls outside the predetermined range. The estimate of the conduction mode inductor current of the PFC stage may be a constant value greater than 0 and less than 1.

Separately or in combination, the adaptive loop may be configured to decrease the DC equivalent value of the AC input voltage measurement if the output of the voltage mode controller is clamped at the maximum value or exceeds a target value, and the adaptive loop may be configured to increase the DC equivalent value of the AC input voltage measurement if the output of the voltage mode controller is clamped at the minimum value or is below the target value. The adaptive loop may be configured to decrease or increase the DC equivalent value of the AC input voltage measurement in predetermined steps.

Separately or in combination, the adaptive loop may be an integrator or proportional-integral control loop configured to adjust the DC equivalent value of the AC input voltage measurement so that the output of the voltage mode controller moves towards a target value. The integrator or proportional-integral control loop may be configured to compute a delta value based on the difference between the target value and the output of the voltage mode controller and add the delta value to the DC equivalent value of the AC input voltage measurement.

Separately or in combination, the adaptive loop may be configured to modify a step size of a change made to the DC equivalent value of the AC input voltage measurement if the change exceeds a predetermined threshold.

Separately or in combination, the adaptive loop may be enabled and performed every sampling period during a burst-on period of the PFC stage in the burst mode if the output of the voltage mode controller falls outside the predetermined range, and the adaptive loop may be disabled once the output of the voltage mode controller falls within the predetermined range.

Separately or in combination, upon returning to the steady-state mode from the burst mode, the current mode controller may be configured to operate the PFC stage in CCM using the output of the voltage mode controller and the DC equivalent value of the AC input voltage measurement from the burst mode as initial values.

According to an embodiment of a power supply, the power supply comprises: a power factor correction (PFC) stage; an LLC converter coupled to the PFC stage; a current mode controller configured to operate the PFC stage in continuous-conduction mode (CCM) in a steady-state mode of the power supply, by implementing a current control loop which has AC input voltage measurements as an input; a voltage mode controller configured to operate the PFC stage in discontinuous-conduction mode (DCM) for at least part of a burst mode of the power supply, by implementing a voltage control loop which does not have AC input voltage measurements as an input; and an adaptive loop configured to modify the voltage control loop if an output of the voltage mode controller in the burst mode and which is proportional to power in average current mode control falls outside a predetermined range.

According to an embodiment of a method of operating a power supply having a power factor correction (PFC) stage and an LLC converter coupled to the PFC stage, the method comprises: operating the PFC stage in continuous-conduction mode (CCM) in a steady-state mode of the power supply using a current mode controller, by implementing a current control loop which has AC input voltage measurements as an input; operating the PFC stage in discontinuous-conduction mode (DCM) for at least part of a burst mode of the power supply using a voltage mode controller, by implementing a voltage control loop which does not have AC input voltage measurements as an input; and modifying the voltage control loop if an output of the voltage mode controller in the burst mode and which is proportional to power in average current mode control falls outside a predetermined range.

The predetermined range may define a maximum limit and a minimum limit on power delivered by the power supply in the burst mode, the maximum limit may correspond to a maximum value of the output of the voltage mode controller, and wherein the minimum limit may correspond to a minimum value of the output of the voltage mode controller.

Separately or in combination, operating the PFC stage in DCM for at least part of the burst mode may comprise: determining an on-time for the PFC stage in the burst mode based on the output of the voltage mode controller, a DC equivalent value of an AC input voltage measurement taken prior to entering the burst mode, and an estimate of a conduction mode inductor current of the PFC stage; and modifying the DC equivalent value of the AC input voltage measurement if the output of the voltage mode controller falls outside the predetermined range.

Separately or in combination, modifying the DC equivalent value of the AC input voltage measurement if the output of the voltage mode controller falls outside the predetermined range may comprise: decreasing the DC equivalent value of the AC input voltage measurement if the output of the voltage mode controller is clamped at the maximum value or exceeds a target value; and increasing the DC equivalent value of the AC input voltage measurement if the output of the voltage mode controller is clamped at the minimum value or is below the target value.

Separately or in combination, modifying the DC equivalent value of the AC input voltage measurement if the output of the voltage mode controller falls outside the predetermined range may comprise adjusting the DC equivalent value of the AC input voltage measurement via an integrator or proportional-integral control loop, so that the output of the voltage mode controller moves towards a target value.

Separately or in combination, the method may further comprise: computing a delta value based on the difference between the target value and the output of the voltage mode controller; and adding the delta value to the DC equivalent value of the AC input voltage measurement.

Separately or in combination, the method may further comprise modifying a step size of a change made to the DC equivalent value of the AC input voltage measurement if the change exceeds a predetermined threshold.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide load and line regulation for average current mode CCM-DCM PFC without AC input voltage measurements during burst mode operation in a standby mode of the power supply. By keeping the system in DCM operation as much as possible during boost mode, PFC burst mode operation is possible with a voltage control loop and without input voltage measurements and a current control loop. The embodiments described herein may be implemented in digital controllers, microcontrollers, digital signal processors (DSPs), etc., and may be used to control different types of power supplies such as TV or PC power supplies with CCM PFC and LLC topologies in standby mode to meet line and load regulation requirements.

Figure 1:
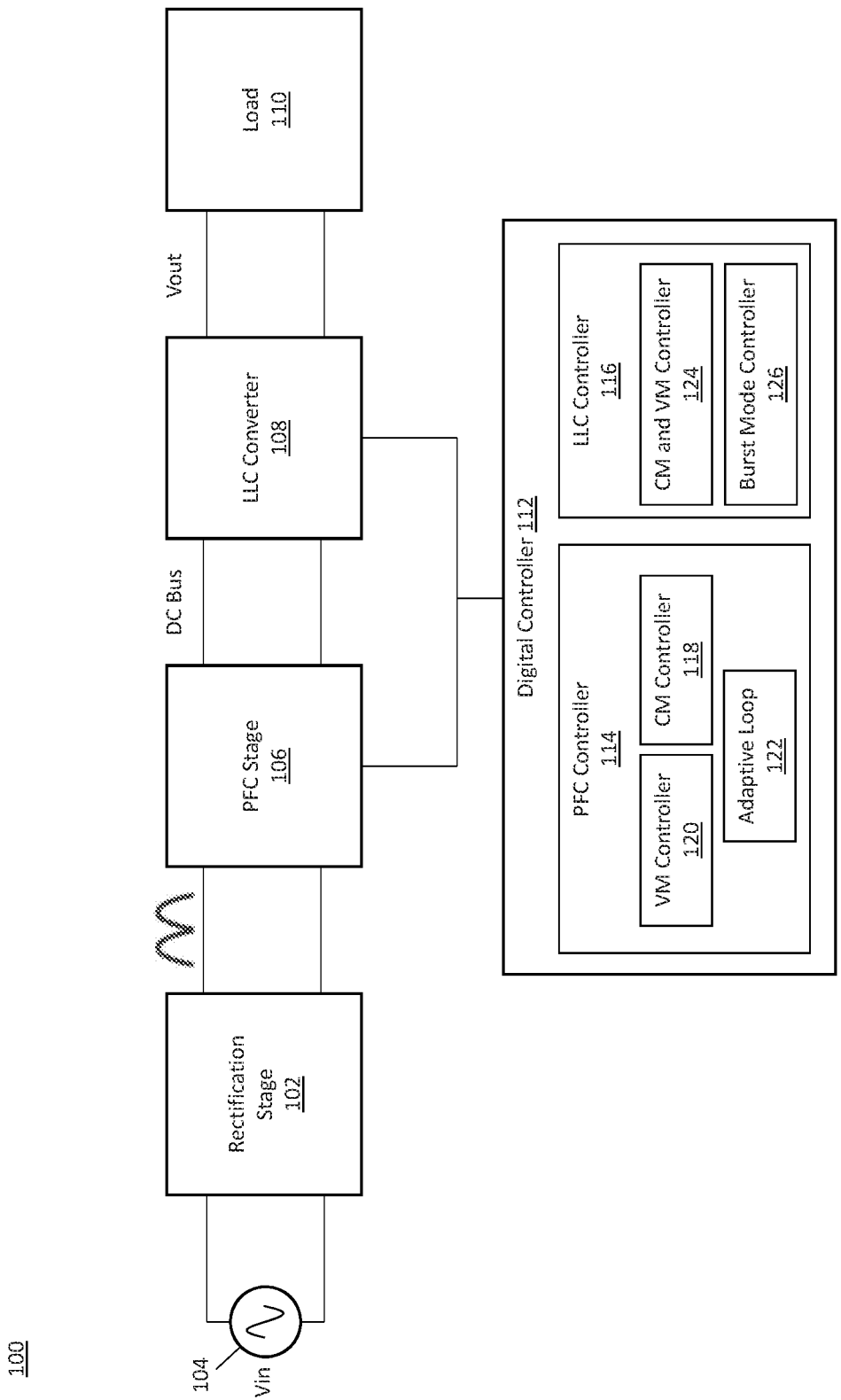
FIG. 1 illustrates a block diagram of an embodiment of a switched mode power supply (SMPS) which provides load and line regulation for average current mode CCM-DCM PFC without AC input voltage measurements during burst mode operation.

FIG. 1 illustrates an embodiment of a switched mode power supply (SMPS) 100. The SMPS 100 includes a rectification stage 102 such as a full wave diode rectifier bridge coupled to AC mains 104, a PFC stage 106 coupled to the rectification stage 102, an LLC converter 108 coupled to the PFC stage 106, and a load 110 coupled to the LLC converter 108. The AC mains 104 may be 115V@ 60 Hz, 230V@ 50 Hz, or any other combination of voltage and frequency. In some cases, the universal voltage range of 85V to 265V AC @ 50 or 60 Hz may apply to the AC mains 104. However, other applications such as avionics may use other frequencies. The rectification stage 102 provides the same polarity of output for either polarity of the AC mains input Vin. The PFC stage 106 shapes the input current of the SMPS 100 to be in synchronization with the AC mains voltage Vin, to maximize the real power drawn from the AC mains 104.

Active PFC may be implemented in several topologies. In one embodiment, the PFC stage 106 is implemented in the boost converter topology. For example, the line voltage Vin may vary from zero to a peak value of typically 375 V. Under these conditions, the PFC stage 106 includes a step-up (boost) converter for outputting a suitably high DC bus voltage (DC Bus), e.g., 380 V or more for the line voltage peak value example of 375 V. A boost converter has a filter inductor on the input side, which provides a smooth continuous input current waveform as opposed to the discontinuous input current of a buck or buck-boost topology. Still, the PFC stage 106 may be implemented in other converter topologies such as buck or buck-boost.

The LLC converter 108 coupled to the PFC stage 106 may include a switching bridge which generates a square waveform to excite an LLC resonant tank of the converter 108. The LLC resonant tank outputs a resonant sinusoidal current that is scaled and rectified by a transformer and rectifier circuit. An output capacitor of the LLC converter 108 filters the rectified ac current and outputs a DC voltage (Vout) to the load 110.

The SMPS 100 also includes a digital controller 112 for controlling the PFC stage 06 and the LLC converter 108. The digital controller 112 include a PFC controller 114 for the PFC stage 106 and an LLC controller 116 for the LLC converter 108. The PFC controller 114 includes a current mode (CM) controller 118, a voltage mode (VM) controller 120 and an adaptive loop 122. The LLC controller 116 includes a CM and VM controller 124 and a burst mode controller 126. The burst mode controller 126 controls the LLC converter 108 in burst mode operation of the SMPS 100, and the CM and VM controller 124 controls the LLC converter 108 in steady-state operation of the SMPS 100. The LLC controller 116 is the master of burst mode operation. The PFC controller 114 regulates the output voltage 'DC Bus' of the PFC stage 106 during burst mode operation within the burst-mode timing provided by the LLC controller 116.

The current mode controller 118 of the PFC controller 114 operates the PFC stage 106 in different conduction modes depending on line and load conditions in the steady-state mode. For example, the current mode controller 118 may operate the PFC stage 106 in CCM for full load/low line, by implementing a current control loop which has AC input voltage measurements as an input. The current mode controller 118 may operate the PFC stage 106 in CCM+DCM within an AC half cycle in full load/high line. The current mode controller 118 may operate the PFC stage 106 in full DCM at 20% load/low line. In CCM, the current in the energy transfer inductor never goes to zero between switching cycles. In DCM, the current goes to zero during part of the switching cycle. These are just a few examples of different conduction modes in steady-state mode of the SMPS 100. In general, the current mode controller 118 may operate the PFC stage 106 in CCM and/or DCM in steady-state mode.

The burst mode control implemented by the digital controller 112 is specific to the PFC stage 106. The LLC converter 108 is controlled by different control blocks in the digital controller 112. The LLC control implemented by the digital controller 112 provides the burst-on and burst-off periods to which the PFC stage 106 is to adhere. The digital controller 112 controls the CCM PFC operation in burst mode with a timing constraint and provides a stable and accurate PFC output voltage regulation (DC Bus) in burst mode under a single AC input and/or under line jump conditions. In burst mode of the SMPS 100, the digital controller 112 controls the PFC stage 106 by implementing a voltage control loop (VM) which does not have AC input voltage measurement as an input. The adaptive loop 122 of the PFC controller 114 modifies the voltage control loop if an output of the voltage mode controller 120 in burst mode and which is proportional to power in average current mode control falls outside a predetermined range. This way, the digital controller 112 may control the PFC stage 106 using the voltage control loop in burst mode so long as the output of the voltage mode controller 120 falls within the predetermined range.

Figure 2:
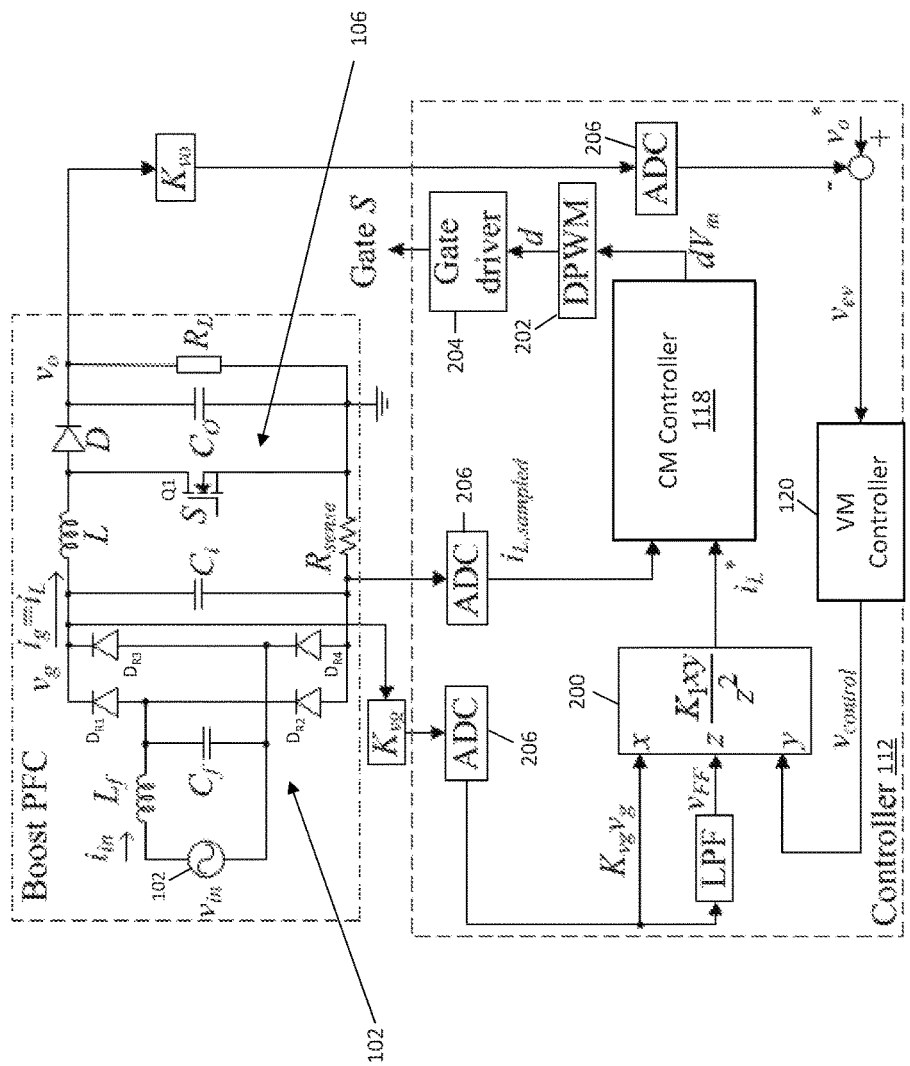
FIG. 2 illustrates a block diagram of the rectification stage, the PFC stage and the digital controller of the SMPS in more detail.

FIG. 2 illustrates the digital controller 112 and the PFC stage 106 in more detail, as related to the burst mode control scheme described herein for CCM PFC without AC input voltage measurements. AC mains 102 is shown connected to the rectification stage 102 by an inductor Lf and capacitor Cf. The rectification stage 102 is shown as a diode bridge in this example and which includes diodes DR1 through DR4 connected as a full wave rectifier. The PFC stage 106 is represented by an input capacitor Ci, an inductor L a switch device Q1 such as a power MOSFET (metal-oxide semiconductor field effect transistor), IGBT (insulated gate bipolar transistor), HEMT (high-electron mobility transistor), etc. controlled by a signal S generated by the digital controller, and a diode D in this example. The LLC converter 108 is represented as a constant power load $R_L$ of the PFC stage 106 where capacitor Co is an output capacitor of the PFC stage 106. The LLC converter 108 is controlled separately by a separate controller 116 and separate gate drivers within the digital controller 112, as previously described herein. The digital controller 112 is a digital platform that contains multiple sense pins, multiple gate drivers, multiple DPWM (digital pulse width modulators), multiple input channel ADC (analog-to-digital converter), CPUs/ALUs (central processor units/arithmetic logic units), etc. The PFC control shown in FIG. 2 is a part of the features included in the digital controller 112. Operation of the digital controller 112 in steady-state mode and burst mode is described next in more detail with reference to FIG. 2, as related to the burst mode control scheme described herein for CCM PFC without AC input voltage measurements.

In steady-state mode, the voltage control loop implemented by the voltage mode controller 120 of the PFC controller 114 is scaled by scaling unit 200 to yield an inductor current reference $i_L^*$. The current control loop implemented by the current mode controller 118 of the PFC controller 114 allows the average current, which is derived from the sampled input current $i_{L,sampled}$, to track the inductor current reference $i_L^*$ to yield a voltage signal dVm which is used by a digital pulse width modulation (DPWM) unit 202 of the digital controller 112 to generate a duty cycle d. A gate driver 204 generates a gate drive signal S for driving the switch device Q1 of the PFC stage 106.

The time instances to burst-on and burst-off are determined by the LLC control in burst mode. The digital controller 112 ensures that the PFC stage 106 bursts on and bursts off synchronously with the LLC converter 108 and maintains PFC output voltage regulation. In one embodiment, the digital controller 112 has a single pin connected to a high-impedance resistor divider within the controller 112 for taking input voltage measurements. The resistor divider is not shown in FIG. 2 for ease of illustration, and the single pin is schematically represented by the arrow connecting the box labelled 'Kvg' to the corresponding analog-to-digital converter (ADC) 206.

During burst mode, the same pin is connected to a start-up cell within the digital controller 112 which does AC detection, and if AC power is lost during standby mode, this pin is used to discharge an external capacitor Cf to a safe voltage level, e.g., in compliance with IEC 62368-1. External capacitor Cf and inductor Lf are a simplified illustration of an EMI (electromagnetic interference) filter. If the output voltage of the SMPS 100 is too low, the digital controller 112 turns on the LLC converter 108 to increase the output voltage. The single pin used for AC detection and AC input voltage measurements cannot be shared because of the burst-on period which includes several switching cycles of the LLC converter 108 and the PFC stage 106. Hence, only one of the two features may be used in burst mode. The digital controller 112 uses the pin for AC detection in standby mode, and may control the PFC stage 106 using the voltage control loop in burst mode because current loop regulation is not possible without input voltage measurements. The digital controller 112 may instead have separate pins for the AC detection and AC input voltage measurement features and still employ the burst mode techniques described herein.

If current mode control is not possible during burst mode operation due to unavailability of input voltage measurements, the current loop implemented by the CCM-DCM average current mode controller 118 shown in FIG. 2 is removed in burst mode. With this configuration, the control may simplify to a single pole system in DCM where voltage mode control is sufficient and stable and there is no current control loop. The voltage loop may implement constant on-time control and the PFC stage 106 may regulate at constant on time for the entire AC half cycle. The SMPS 100 remains stable by keeping the PFC stage 106 in DCM as much as possible during burst mode operation, if input voltage measurements are not available, because the voltage loop simplifies to a single pole system when the PFC stage 106 is in burst mode. Controlling the PFC stage 106 using the voltage control loop in burst mode with constant on-time may result in input current distortion in the case of boost PFC. However, power factor and THD (total harmonic distortion) are not a concern in burst mode. As such, the PFC stage 106 may be operated in DCM during burst mode as much as possible. In some instances, 100% DCM PFC operation in burst mode may not be possible. For example, DCM operation may not be possible near the peak of high line, particularly under 264 VAC where demagnetization slope of the inductor current is very gentle. The current may not drop to zero before the end of the switching period when the PFC switch device Q1 turns on again.

In more detail, the output $v_{control}$ of the voltage mode controller 120 of the PFC controller 114 is proportional to power in average current mode control. The voltage mode controller 120 generates $v_{control}$ based on the difference $v_{ev}$ between a reference voltage $v_o^*$ and a scaled, digitized version of the output voltage $v_o$ where Kvo represents a resistor divider ratio.

To keep the PFC stage 106 in DCM operation as much as possible during burst mode, maximum and minimum limits on power delivered by the SMPS 100 during burst mode may be imposed by the digital controller 112. The minimum limit on power may correspond to a minimum value ($v_{control,min}$) of the output $v_{control}$ of the voltage mode controller 120. In one embodiment, the minimum value is zero. The maximum limit on power may correspond to a maximum value ($v_{control,max}$) of the output $v_{control}$ of the voltage mode controller 120. The maximum limit on power may be determined by theoretical analysis of the DCM operating zone, by simulation of the SMPS 100 in burst mode with current loop and input voltage measurements, by trial and error, etc. In one embodiment, $v_{control,max}$ is approximately 2 times the maximum standby load, due to the transfer of power during the short burst-on period. With this power limit selection during burst mode, CCM operation near the peak of, e.g., 264 VAC may be expected because the demagnetization slope of the inductor current is very gentle. However, voltage regulation remains stable. The maximum power limit may be lower in burst mode than in steady-state mode.

In steady-state operation, the inductor current reference $i_L^*$ in CCM with average current mode control is given by:

$$i_L^* = \frac{K_1 v_{control} v_g}{v_{FF}^2} \quad (1)$$

The average inductor current in a switching cycle is given by:

$$i_L = \frac{1}{2}\frac{v_g t_{on}}{L}\frac{(t_{on}+t_{off})}{t_{sw}} = \frac{1}{2}\frac{v_g t_{on}}{L}\frac{t_{cyc}}{t_{sw}} = i_{L,sampled} K_{corr} \quad (2)$$

where $v_g$ is the rectified AC input voltage, $v_{control}$ is the output of the voltage control loop implemented by the voltage mode controller 120 of the PFC controller 114, $K_1$ is a constant of proportionality which balances the gain difference between the reference inductor current $i_L^*$ and the sampled average inductor current $i_{L,sampled}$, $v_{FF}$ is the DC equivalent value of the sampled rectified AC input voltage, $t_{on}$ is the turn-on period of the switch device Q1 included in the PFC stage 106, $t_{off}$ is the turn-off period of the switch device Q1 included in the PFC stage 106, $t_{sw}$ is the fixed switching period, L is the boost inductance, $i_{L,sampled}$ is the sampled inductor current at the middle of the turn-on period, $$K_{corr} = \frac{(t_{on}+t_{off})}{t_{sw}} = \frac{t_{cyc}}{t_{sw}} = \frac{dv_o}{v_o - v_g}$$

is an estimate of the conduction mode of the inductor current, and d is the duty ratio given by $$\frac{t_{on}}{t_{sw}}.$$

The time instances to burst-on ($t_{on}$) and burst-off ($t_{off}$) are determined by the LLC control in burst mode. The digital controller 112 may include analog-to-digital converter (ADC) circuitry 206 for converting analog input signals to corresponding digital values.

In CCM, $K_{corr}=1$ because $t_{on}+t_{off}=t_{sw}$. In DCM, $0<K_{corr}<1$ because $t_{on}+t_{off}<t_{sw}$. In standby mode with DCM operation and equating (1) with (2), an equivalency may be realized as given by:

$$t_{on}\frac{t_{cyc}}{t_{sw}} = \frac{2LK_1 v_{control}}{v_{FF}^2} = \frac{K_2 v_{control}}{v_{FF}^2} \quad (3)$$

The on-time in burst mode is then derived as follows:

$$t_{on} K_{corr} = \frac{K_2 v_{control}}{v_{FF}^2} = t_{onDesired} \quad (4)$$

$$t_{on} = \frac{t_{onDesired}}{K_{corr}} \quad (5)$$

From (5), the turn-on period of the switch device Q1 included in the PFC stage 106 may be obtained. The scaling unit 200 shown in FIG. 2 and used in CCM operation may be reused and modified to implement (4) for DCM operation in burst mode. In one embodiment, the initial value for $v_{FF}$ in burst mode is based on the last steady-state value of the input voltage measurement. That is, the initial value for $v_{FF}$ in burst mode may be a low-pass filtered, DC equivalent value of an AC input voltage measurement taken just prior to entering burst mode. The 'x' input to the scaling unit 200 corresponds to a scaled version of an input voltage measurement $v_g$ where Kvg represents a resistor divider ratio.

$K_{corr}$ estimation is not possible in burst mode without input voltage or $t_{cyc}$ measurements. The digital controller 112 uses an assumption for $K_{corr}$ to keep the PFC stage 106 in DCM operation as much as possible based on the $v_{control,max}$ selection. Selecting a lower value of $K_{corr}$ causes the voltage mode controller 120 of the PFC controller 114 to regulate to a lower $v_{control}$ value to get the same $t_{on}$. Selecting a higher value of $K_{corr}$ causes the voltage mode controller 120 to regulate to a higher $v_{control}$ value to get the same $t_{on}$. Hence, $v_{control}$ range is affected by the selection of the $K_{corr}$ estimate. $K_{corr}$ may be selected based on simulation of the SMPS 100 in burst mode with current loop and input voltage measurements, by trial and error, etc.

With the approach described above, the PFC stage 106 may remain in DCM operation as much as possible and burst mode operation of CCM PFC is possible with a voltage control loop and without input voltage measurements and a current control loop. In addition to load regulation of an average current mode CCM PFC in standby/burst mode without AC input voltage measurements, the digital controller 112 may also provide line regulation in standby/burst mode without AC input voltage measurements.

As previously explained herein, the digital controller 112 may determine the on-time $t_{on}$ for the switch device Q1 of the PFC stage 106 in burst mode based on the output $v_{control}$ of the voltage mode controller 120 of the PFC controller 114, the DC equivalent value $v_{FF}$ of an AC input voltage measurement taken prior to entering the burst mode, and an estimate $K_{corr}$ of the conduction mode inductor current of the PFC stage 106. The adaptive loop 122 included in or associated with the digital controller 112 may modify $v_{FF}$ if $v_{control}$ falls outside the predetermined range defined by $v_{control,max}$ and $v_{control,min}$ to account for line jumps in the AC input voltage Vin.

An accurate value of the DC equivalence $v_{FF}$ of the sampled rectified AC input voltage is difficult to obtain without AC input voltage measurements. However, an accurate value is needed to approximate a $v_{FF}$ value for any number of cases of input line jumps between, e.g., 90 VAC and 264 VAC in burst mode. For example, with a fixed $v_{FF}$ value at 264 VAC, a line jump from 264 VAC to 90 VAC in burst mode will demand a larger $t_{on}$ and may cause the output $v_{control}$ of the voltage mode controller 120 of the PFC controller 114 to clamp at the maximum value $v_{control,max}$ defined for burst mode, to prevent deep CCM operation. The PFC output voltage may drop below a target value or even collapse. With a fixed $v_{FF}$ value at 90 VAC, a line jump from 90 VAC to 264 VAC in burst mode will demand a smaller $t_{on}$ and overvoltage protection will be triggered with the initial larger $t_{on}$. The output $v_{control}$ of the voltage mode controller 120 will drop to $v_{control,min}$, e.g., zero to reduce $t_{on}$ and clamp at $v_{control,min}$ for a long period. Any small increase in the output $v_{control}$ of the voltage mode controller 120 when the PFC output voltage drops below a target value leads to a large change in $t_{on}$. This may cause a limit cycling in the PFC output voltage, or the PFC output voltage may even collapse.

To mitigate these issues, the digital controller 112 may approximate a $v_{FF}$ value required to maintain PFC output voltage regulation and to accommodate various AC input line jump cases. In one embodiment, the low-pass filter (LPF) in FIG. 2 is replaced by the adaptive loop 122 for making adjustments to $v_{FF}$ in burst mode.

Figure 3:
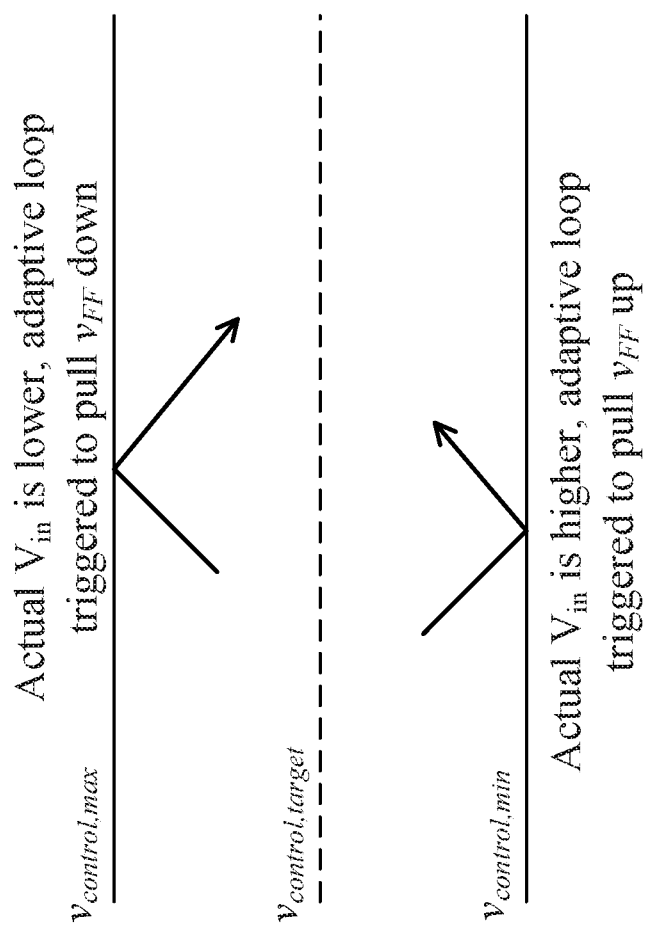
FIG. 3 illustrates a plot diagram of an embodiment of the adaptive adjustments made by the digital controller of the SMPS in burst mode.

FIG. 3 illustrates an embodiment of the adjustments made to $v_{FF}$ by the adaptive loop 122 of the PFC controller 114 in burst mode, to meet various AC input line jump cases. According to this embodiment, the adaptive loop 122 decreases $v_{FF}$ if the output $v_{control}$ of the voltage mode controller 120 of the PFC controller 114 is clamped at the maximum value $v_{control,max}$ or exceeds a target value $v_{control,target}$, and increases $v_{FF}$ if $v_{control}$ is clamped at the minimum value $v_{control,min}$ or falls below the target value $v_{control,target}$. In one embodiment, the initial value for $v_{FF}$ in burst mode is based on the last steady-state value of $v_{FF}$. The adaptive $v_{FF}$ adjustment loop 122 may be enabled and performed at every sampling period $T_{sv}$ during the burst-on period if the output $v_{control}$ of the voltage mode controller 120 falls outside the predetermined range for burst mode defined by $v_{control,max}$ and $v_{control,min}$. The adaptive $v_{FF}$ adjustment loop 122 may be disabled once $v_{control}$ falls within the predetermined range for burst mode defined by $v_{control,max}$ and $v_{control,min}$.

If the actual AC input voltage Vin is lower, $t_{on}$ will be smaller than desired, the PFC output voltage (DC Bus) will decrease and the output $v_{control}$ of the voltage mode controller 120 will increase. Once $v_{control}$ is clamped at $v_{control,max}$ which is defined for burst mode to keep the PFC stage 106 in DCM operation, the adaptive loop 122 of the PFC controller 114 is triggered to decrease (pull down) $v_{FF}$. If the actual AC input voltage Vin is higher, $t_{on}$ will be bigger than desired, the PFC output voltage will increase and the output $v_{control}$ of the voltage mode controller 120 will decrease. Once $v_{control}$ is clamped at $v_{control,min}$ which is the minimum power for burst mode and is typically zero, the adaptive loop 122 is triggered to increase (pull up) $v_{FF}$.

The adaptive $v_{FF}$ adjustment loop 122 of the PFC controller 114 may be implemented as a closed-loop feedback control that adjusts the $v_{FF}$ value so that $v_{control}$ moves towards a target value $v_{control,target}$. For example, the closed-loop feedback control may be hysteresis control, integral control or proportional-integral control. For larger line jumps, e.g., between 90 VAC to 264 VAC, the adaptive loop 122 may change the $v_{FF}$ value with a bigger step size if the change in $v_{FF}$ exceeds a predetermined threshold. That is, the adaptive loop 122 may decrease or increase $v_{FF}$ in predetermined steps and modify the step size of the change made to $v_{FF}$ if the change exceeds the predetermined threshold. Upon returning to the steady-state operation from burst mode, the current mode controller 118 of the PFC controller 114 may operate the PFC stage 106 in CCM using the $v_{control}$ and $v_{FF}$ values from burst mode as initial values in steady-state mode.

Figure 4:
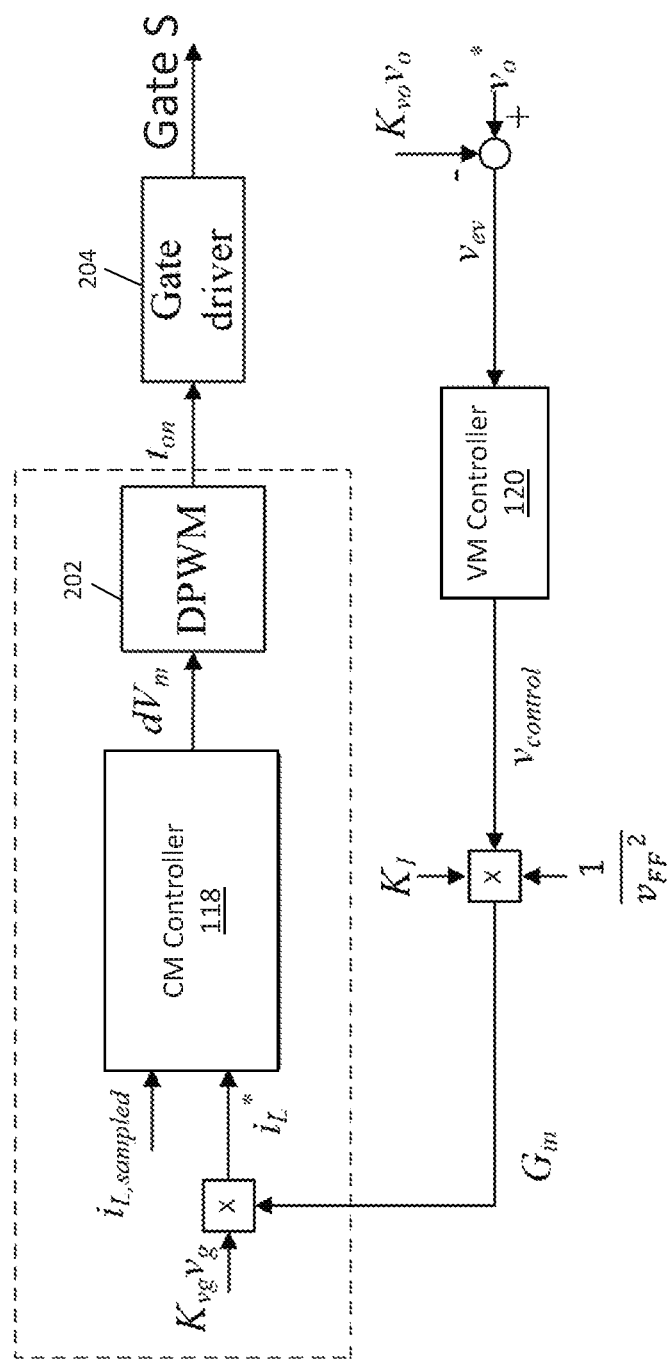
FIG. 4 illustrates a block diagram of an embodiment of the average current mode CCM PFC control technique implemented by the digital controller in steady-state operation.
Figure 5:
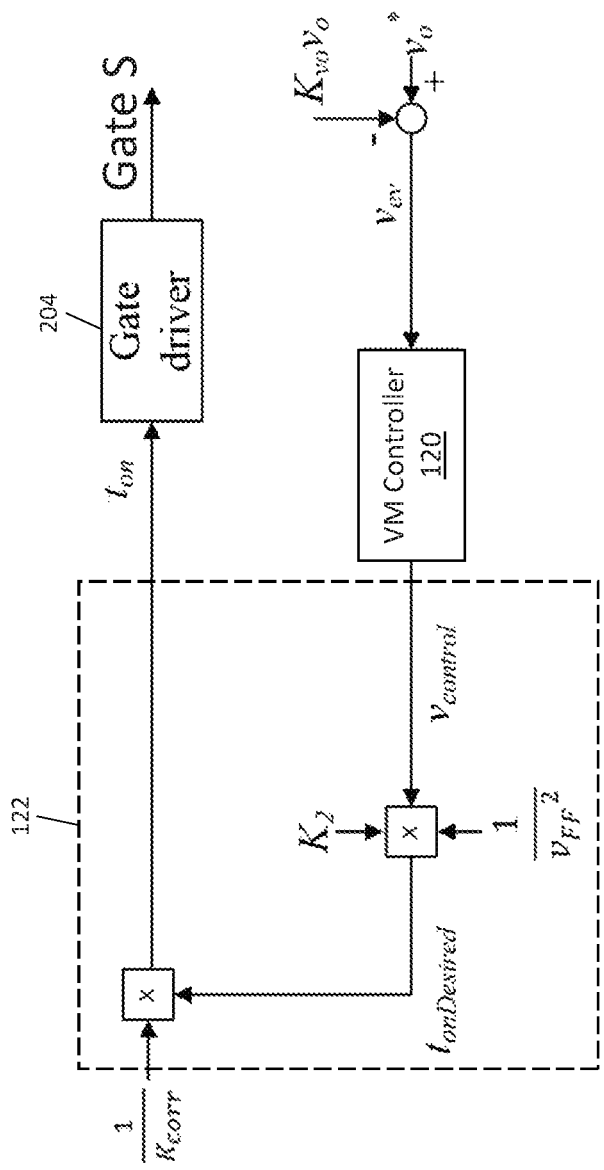
FIG. 5 illustrates a block diagram of an embodiment of the burst mode control implemented by the digital controller for average current mode CCM PFC without AC input voltage measurements.

FIG. 4 illustrates an embodiment of the CCM-DCM average current mode PFC control technique implemented by the digital controller 112 in steady-state operation, and FIG. 5 illustrates an embodiment of the burst mode control implemented by the digital controller 112 for average current mode CCM PFC without AC input voltage measurements. The current mode controller 118 of the PFC controller 114 is disabled in burst mode, as schematically shown in FIG. 5. The voltage mode controller 120 of the PFC controller 114 may be the same in steady-state and burst modes, except with reduced $v_{control,max}$ in burst mode to keep the PFC stage 106 in DCM operation as much as possible. The upper power limit $v_{control,max}$ may be reduced, e.g., to 20% or less of the rated load in burst mode. The maximum limit $v_{control,max}$ on power may be determined by simulation of the SMPS 100 in burst mode with current loop and input voltage measurements, by trial and error, etc.

The turn-on period $t_{on}$ of the switch device Q1 included in the PFC stage 106 is computed based on (5). The turn-on period $t_{on}$ is provided to the gate driver 204 for the PFC switch device Q1, to set the duty cycle. From (2), $$i_{L,rms} = \frac{1}{2} \frac{v_{g,rms} t_{on}}{L} \frac{t_{cyc}}{t_{sw}} = \frac{1}{2} \frac{v_{g,rms}}{L} t_{onDesired}$$

and therefore $$t_{onDesired} = \frac{2L i_{L,rms}}{v_{g,rms}} = \frac{2L P_{in}}{v_{g,rms}^2}.$$

From (4), $$K_2 = \frac{t_{onDesired} v_{FF}^2}{v_{control}}$$

and coefficient $K_2$ may be determined from a system operating point (e.g. at rated load under 90 VAC).

The initial value for $v_{FF}$ in burst mode may be based on the last steady-state value, as previously described herein. $K_{corr}$ may be selected to be less than 1 and greater than 0. $K_{corr}$ may be determined based on simulation, trial and error, etc. In one embodiment, $K_{corr}$ is predetermined and remains unchanged during operation of the SMPS 100 in burst mode. In another embodiment, $K_{corr}$ may be updated, e.g., based on system learning.

In a specific example of a 240 W CCM PFC-LLC system, $K_{corr}$ may be 0.8 based on simulation of the system in burst mode with current loop and input voltage measurements. Other values of $K_{corr}$ are possible and depend on the system design parameters. For the same exemplary 240 W CCM PFC-LLC system, $v_{control,min}$ may be set to zero, $v_{control,max}$ may be set to 20% (or higher or lower) of the rated load, and $v_{control,target}$ may be set to 10% (or higher or lower) of the rated load. The digital controller 112 may convert the DC equivalent value $v_{FF}$ of the sampled rectified AC input voltage into a digital number in decimal (d) of base 10, by multiplying with the corresponding ADC range (an X-bit ADC gives ADC range of $2^{X-1}$) and divided by the ADC voltage reference. Implementation examples of the adaptive $v_{FF}$ adjustment implemented by the adaptive loop 122 of the digital controller 112 are described next.

The adaptive loop 122 may decrease or increase $v_{FF}$ in predetermined steps, as previously explained herein.

In another embodiment, the adaptive loop 122 may implement hysteresis control. For example, if $v_{control}$ is clamped at $v_{control,max}$ or if $v_{control} > v_{control,target}$, the adaptive loop 122 may decrease $v_{FF}$ by $v_{step1}$. In a specific example, the adaptive loop 122 may decrease $v_{FF}$ by 1 d which represents 0.2 VAC. If $v_{control}$ is clamped at $v_{control,min}$ or if $v_{control} < v_{control,target}$, the adaptive loop 122 may increase $v_{FF}$ by $v_{step1}$ in this example. In the case of a larger AC input line jump, the adaptive loop 122 may change the $v_{FF}$ value by a larger step size if the change in $v_{FF}$ exceeds a certain threshold $v_{FF,thr}$. For example, the adaptive loop 122 may change $v_{FF}$ by a larger step size if the change in $v_{FF}$ exceeds ±45 d which represents ±5VAC. If $v_{control}$ is clamped at $v_{control,max}$ or if $v_{control} > v_{control,target}$, the adaptive loop 122 may decrease $v_{FF}$ by $v_{step2}$. In a specific example, the adaptive loop 122 may decrease $v_{FF}$ by 18 d which represents 2 VAC. If $v_{control}$ is clamped at $v_{control,min}$ or if $v_{control} < v_{control,target}$, the adaptive loop 122 may increase $v_{FF}$ by $v_{step2}$ in this example.

Figure 6:
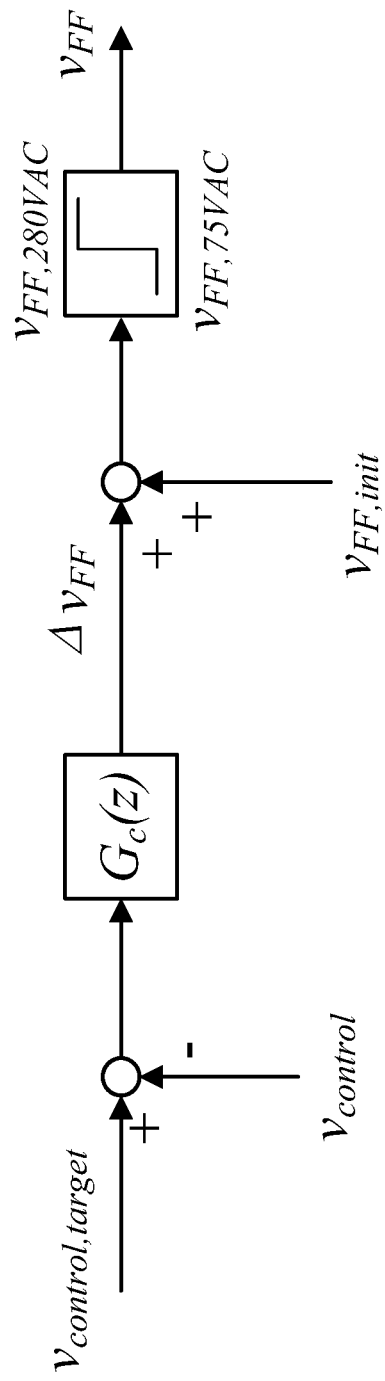
FIG. 6 illustrates a block diagram of an embodiment in which the adaptive loop implements integral or proportional-integral control.

FIG. 6 illustrates an embodiment in which the adaptive loop 122 of the PFC controller 114 implements integral or proportional-integral control. A feedback controller $G_c(z)$ may be an integrator (I) or a proportional-integral (PI) controller. The feedback controller $G_c(z)$ adjusts $v_{FF}$ so that the output $v_{control}$ of the voltage mode controller 120 of the PFC controller 114 moves towards a target $v_{control,target}$. The initial value $v_{FF,init}$ for $v_{FF}$ in burst mode may be based on the last steady-state AC input voltage measurement, as previously described herein. The adaptive $v_{FF}$ adjustment loop 122 of the PFC controller 114 is enabled and performed at every sampling period $T_{sv}$ during the burst-on period if $v_{control}$ falls outside the predetermined range for burst mode defined by $v_{control,max}$ and $v_{control,min}$. The adaptive $v_{FF}$ adjustment loop 122 may be disabled once $v_{control}$ falls within the predetermined range for burst mode defined by $v_{control,max}$ and $v_{control,min}$.

The feedback controller $G_c(z)$ computes a value $\Delta v_{FF}$ based on the difference between $v_{control,target}$ and $v_{control}$, and $v_{FF}$ is given by the sum of $v_{FF,init}$ and $\Delta v_{FF}$. If, for example, $v_{FF}$ is higher than 280 VAC ($v_{FF,280VAC}$) or some other maximum limit, the adaptive loop 122 of the PFC controller 114 limits $v_{FF}$ to the maximum limit. If $v_{FF}$ is lower than 75VAC ($v_{FF,75VAC}$) or some other minimum limit, the adaptive loop 122 limits $v_{FF}$ to the minimum limit to avoid computational overflow. For a larger AC input line jump, the adaptive loop 122 may change the $v_{FF}$ value with a bigger step by having a larger gain in $G_c(z)$, e.g., if the change in $\Delta v_{FF}$ exceeds a certain threshold $v_{FF,thr}$ (e.g. ±45 d which represents ±5VAC).

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A digital controller for a power supply having a power factor correction (PFC) stage and an LLC converter coupled to the PFC stage, the digital controller comprising:
    a current mode controller configured to operate the PFC stage in continuous-conduction mode (CCM) in a steady-state mode of the power supply, by implementing a current control loop which has AC input voltage measurements as an input;
    a voltage mode controller configured to operate the PFC stage in discontinuous-conduction mode (DCM) for at least part of a burst mode of the power supply, by implementing a voltage control loop which does not have AC input voltage measurements as an input; and
    an adaptive loop configured to modify the voltage control loop if an output of the voltage mode controller in the burst mode and which is proportional to power in average current mode control falls outside a predetermined range.

2. The digital controller of claim 1, wherein the predetermined range defines a maximum limit and a minimum limit on power delivered by the power supply in the burst mode, wherein the maximum limit corresponds to a maximum value of the output of the voltage mode controller, and wherein the minimum limit corresponds to a minimum value of the output of the voltage mode controller.

3. The digital controller of claim 2, wherein the maximum limit is approximately 2 times a maximum load in the burst load.

4. The digital controller of claim 2, wherein the maximum limit is lower in the burst mode than in the steady-state mode.

5. The digital controller of claim 2, wherein the digital controller is configured to determine an on-time for the PFC stage in the burst mode based on the output of the voltage mode controller, a DC equivalent value of an AC input voltage measurement taken prior to entering the burst mode, and an estimate of a conduction mode inductor current of the PFC stage, and wherein the adaptive loop is configured to modify the DC equivalent value of the AC input voltage measurement if the output of the voltage mode controller falls outside the predetermined range.

6. The digital controller of claim 5, wherein the estimate of the conduction mode inductor current of the PFC stage is a constant value greater than 0 and less than 1.

7. The digital controller of claim 5, wherein the adaptive loop is configured to decrease the DC equivalent value of the AC input voltage measurement if the output of the voltage mode controller is clamped at the maximum value or exceeds a target value, and wherein the adaptive loop is configured to increase the DC equivalent value of the AC input voltage measurement if the output of the voltage mode controller is clamped at the minimum value or is below the target value.

8. The digital controller of claim 7, wherein the adaptive loop is configured to decrease or increase the DC equivalent value of the AC input voltage measurement in predetermined steps.

9. The digital controller of claim 7, wherein the adaptive loop is an integrator or proportional-integral control loop configured to adjust the DC equivalent value of the AC input voltage measurement so that the output of the voltage mode controller moves towards a target value.

10. The digital controller of claim 9, wherein the integrator or proportional-integral control loop is configured to compute a delta value based on the difference between the target value and the output of the voltage mode controller and add the delta value to the DC equivalent value of the AC input voltage measurement.

11. The digital controller of claim 5, wherein the adaptive loop is configured to modify a step size of a change made to the DC equivalent value of the AC input voltage measurement if the change exceeds a predetermined threshold.

12. The digital controller of claim 1, wherein the adaptive loop is enabled and performed every sampling period during a burst-on period of the PFC stage in the burst mode if the output of the voltage mode controller falls outside the predetermined range, and wherein the adaptive loop is disabled once the output of the voltage mode controller falls within the predetermined range.

13. The digital controller of claim 1, wherein upon returning to the steady-state mode from the burst mode, the current mode controller is configured to operate the PFC stage in CCM using the output of the voltage mode controller and the DC equivalent value of the AC input voltage measurement from the burst mode as initial values.

14. A power supply, comprising:
    a power factor correction (PFC) stage;
    an LLC converter coupled to the PFC stage;
    a current mode controller configured to operate the PFC stage in continuous-conduction mode (CCM) in a steady-state mode of the power supply, by implementing a current control loop which has AC input voltage measurements as an input;
    a voltage mode controller configured to operate the PFC stage in discontinuous-conduction mode (DCM) for at least part of a burst mode of the power supply, by implementing a voltage control loop which does not have AC input voltage measurements as an input; and
    an adaptive loop configured to modify the voltage control loop if an output of the voltage mode controller in the burst mode and which is proportional to power in average current mode control falls outside a predetermined range.

15. A method of operating a power supply having a power factor correction (PFC) stage and an LLC converter coupled to the PFC stage, the method comprising:
    operating the PFC stage in continuous-conduction mode (CCM) in a steady-state mode of the power supply using a current mode controller, by implementing a current control loop which has AC input voltage measurements as an input;
    operating the PFC stage in discontinuous-conduction mode (DCM) for at least part of a burst mode of the power supply using a voltage mode controller, by implementing a voltage control loop which does not have AC input voltage measurements as an input; and
    modifying the voltage control loop if an output of the voltage mode controller in the burst mode and which is proportional to power in average current mode control falls outside a predetermined range.

16. The method of claim 15, wherein the predetermined range defines a maximum limit and a minimum limit on power delivered by the power supply in the burst mode, wherein the maximum limit corresponds to a maximum value of the output of the voltage mode controller, and wherein the minimum limit corresponds to a minimum value of the output of the voltage mode controller.

17. The method of claim 15, wherein operating the PFC stage in DCM for at least part of the burst mode comprises:
   determining an on-time for the PFC stage in the burst mode based on the output of the voltage mode controller, a DC equivalent value of an AC input voltage measurement taken prior to entering the burst mode, and an estimate of a conduction mode inductor current of the PFC stage; and
   modifying the DC equivalent value of the AC input voltage measurement if the output of the voltage mode controller falls outside the predetermined range.

18. The method of claim 15, wherein modifying the DC equivalent value of the AC input voltage measurement if the output of the voltage mode controller falls outside the predetermined range comprises:
   decreasing the DC equivalent value of the AC input voltage measurement if the output of the voltage mode controller is clamped at the maximum value or exceeds a target value; and
   increasing the DC equivalent value of the AC input voltage measurement if the output of the voltage mode controller is clamped at the minimum value or is below the target value.

19. The method of claim 15, wherein modifying the DC equivalent value of the AC input voltage measurement if the output of the voltage mode controller falls outside the predetermined range comprises:
   adjusting the DC equivalent value of the AC input voltage measurement via an integrator or proportional-integral control loop, so that the output of the voltage mode controller moves towards a target value.

20. The method of claim 19, further comprising:
   computing a delta value based on the difference between the target value and the output of the voltage mode controller; and
   adding the delta value to the DC equivalent value of the AC input voltage measurement.

21. The method of claim 15, wherein modifying the DC equivalent value of the AC input voltage measurement if the output of the voltage mode controller falls outside the predetermined range comprises:
   decreasing or increasing the DC equivalent value of the AC input voltage measurement in predetermined steps.

22. The method of claim 15, further comprising:
   modifying a step size of a change made to the DC equivalent value of the AC input voltage measurement if the change exceeds a predetermined threshold.

* * * * *